Feb. 17, 1925. 1,526,998
H. B. MILSTEAD
SLIDING CURTAIN FOR AUTOMOBILES
Filed Oct. 8, 1923 4 Sheets-Sheet 1
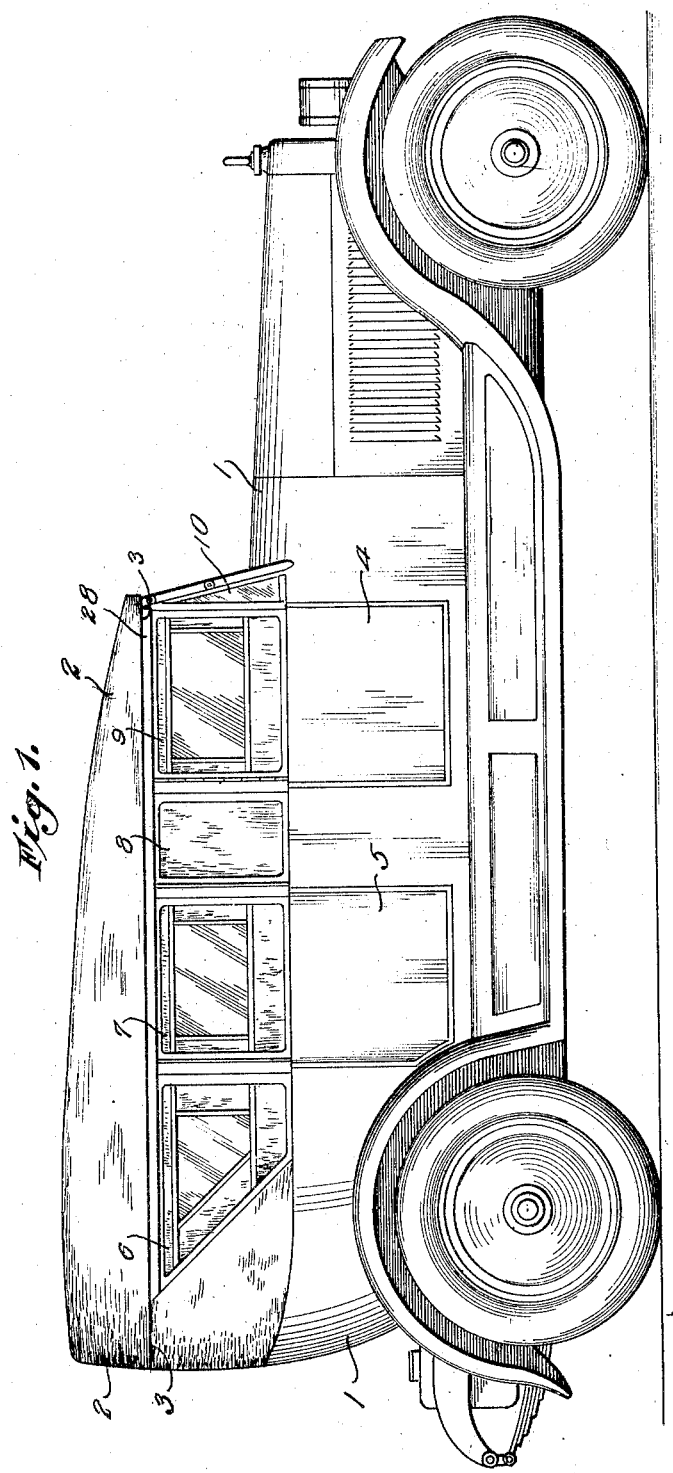
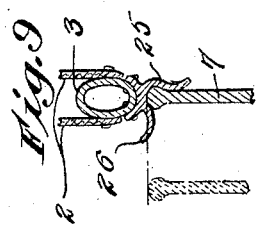
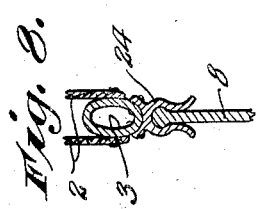
Inventor
H. B. Milstead
by
Lester L. Sargent
Attorney

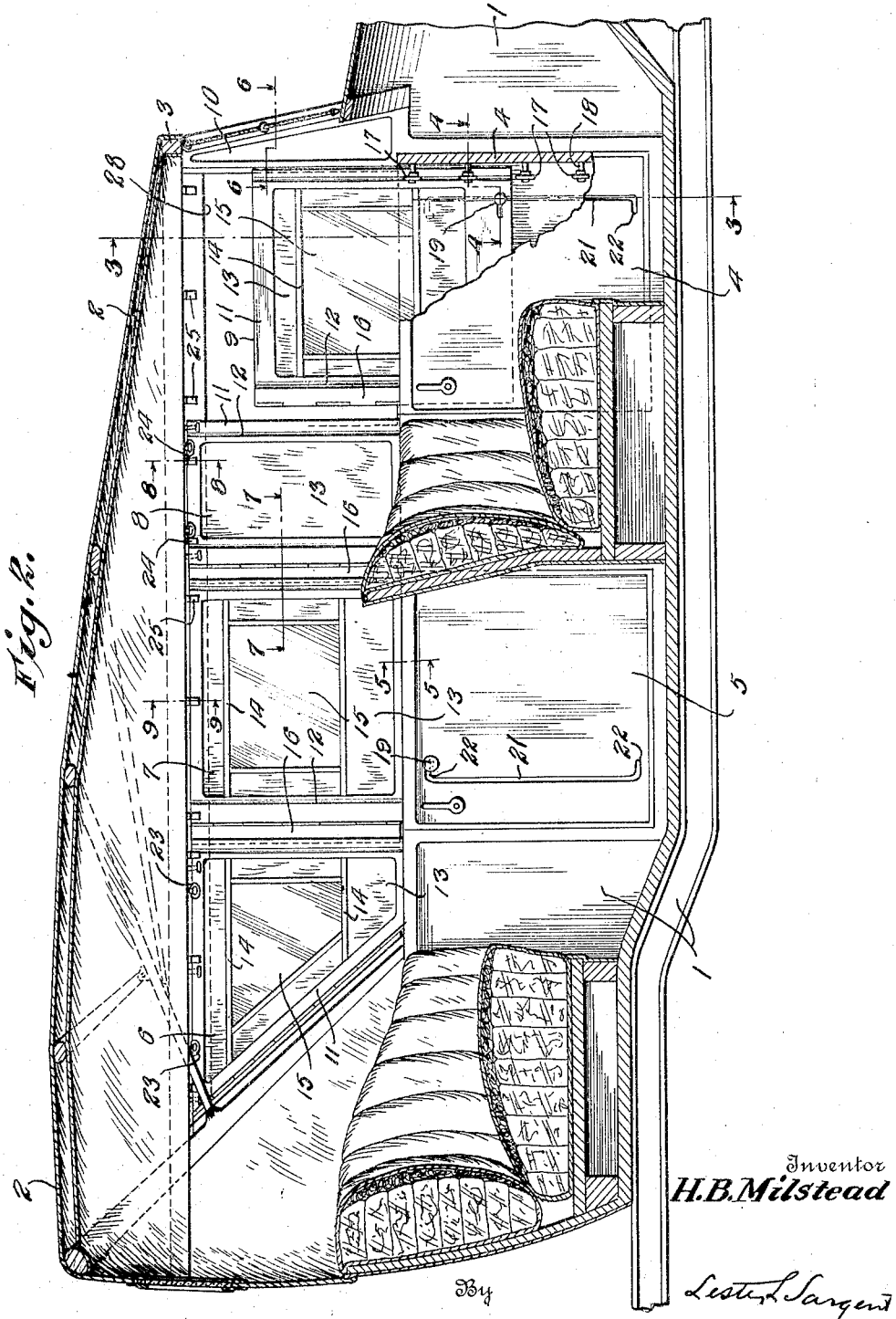

Feb. 17, 1925.
H. B. MILSTEAD
SLIDING CURTAIN FOR AUTOMOBILE
Filed Oct. 8, 1923
1,526,998
4 Sheets-Sheet 3
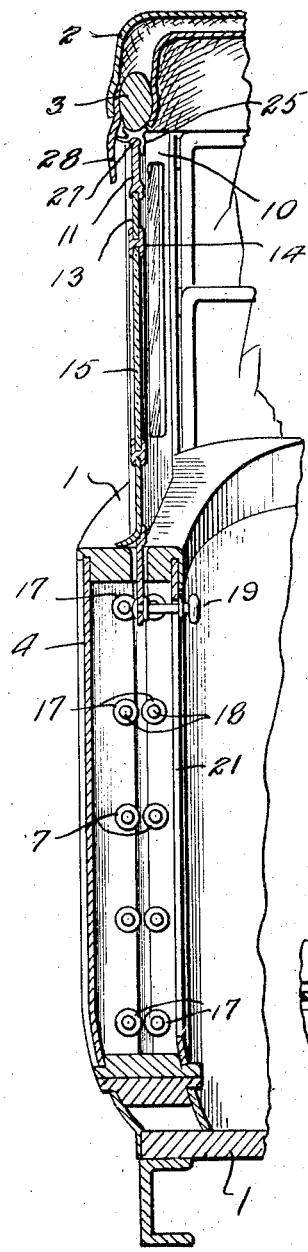
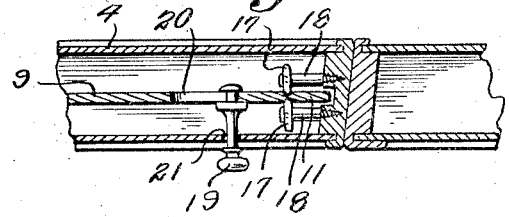
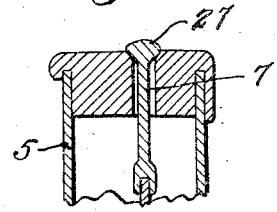
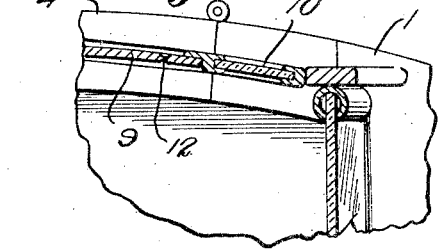
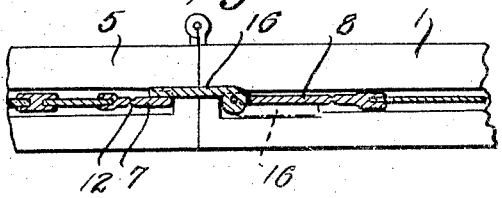
Inventor
H. B. Milstead
By Lester L. Sargent
Attorney

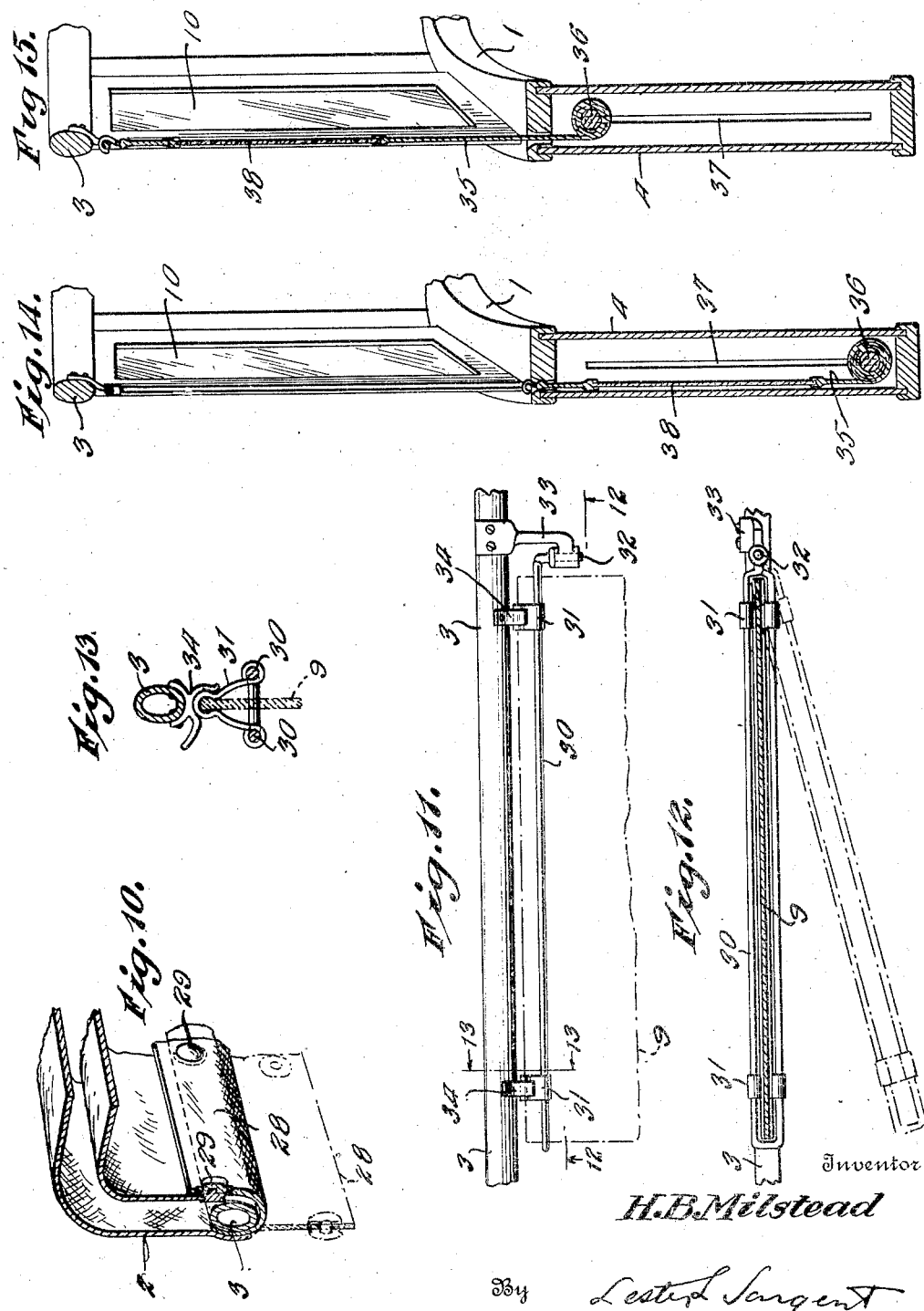

Patented Feb. 17, 1925.

1,526,998

UNITED STATES PATENT OFFICE.

HENRY B. MILSTEAD, OF CHARLOTTE, NORTH CAROLINA.

SLIDING CURTAIN FOR AUTOMOBILES.

Application filed October 8, 1923. Serial No. 667,321.

*To all whom it may concern:*

Be it known that I, HENRY B. MILSTEAD, a citizen of the United States, residing at Charlotte, in the county of Mecklenburg and State of North Carolina, have invented a new and useful Sliding Curtain for Automobiles, of which the following is a specification.

The object of my invention is to provide a novel, rigid, durable, beautiful and efficient sliding curtain for automobiles, which, for a small additional cost in manufacturing will give the open car all the dignity and security of a sedan and this without sacrifice of its utility and adaptability. It is also my object to provide several novel forms of construction disclosed in the accompanying drawings and to provide the novel combination and arrangement of parts hereinafter described. I attain these and other objects of my invention by the mechanism illustrated in the accompanying drawings, in which:

Figure 1 is a side elevation of the invention from the exterior of the car;

Fig. 2 is a side elevation of my invention from the interior of the car, which is shown in section;

Fig. 3 is an enlarged vertical section of my invention, and the portion of the car in which it is slidably mounted, on the line 3—3 of Fig. 2;

Fig. 4 is an enlarged detail horizontal sectional view on line 4—4 of Fig. 2;

Fig. 5 is an enlarged detail vertical section on line 5—5 of Fig. 2;

Fig. 6 is an enlarged horizontal section on line 6—6 of Fig. 2;

Fig. 7 is an enlarged horizontal section on line 7—7 of Fig. 2;

Fig. 8 is an enlarged vertical section on line 8—8 of Fig. 2;

Fig. 9 is an enlarged vertical section on line 9—9 of Fig. 2;

Fig. 10 is an enlarged detail perspective view, partly in section, of members 3, 28 and 29;

Fig. 11 is a detail elevational view of a modification of the invention;

Fig. 12 is a section of same;

Fig. 13 is a section on line 13—13 of Fig. 11;

Fig. 14 is a vertical section of the modified form of sliding curtain; and

Fig. 15 is a similar view of the curtain in a raised instead of in the lowered position shown in Fig. 14.

Like numerals indicate like parts in each of the several views.

Referring to the accompanying drawings, there is shown a conventional automobile body 1, having a conventional top 2 and the usual frame 3, front door 4, and rear door 5, for a touring car. I provide a triangular rear side curtain 6, rear door curtain 7, intermediate curtain 8 and front door curtain 9, and the novel stationary windshield extension 10, all as shown in Fig. 1. See also Fig. 6.

As shown in Fig. 2, I provide suitable metal frames 11 for each curtain. I provide longitudinal grooves 12 on both sides of the curtains, which slide on small revolving metal discs 17, mounted on studs 18 on the inside of the curtain container in the tonneau, thus insuring easy and silent manipulation of the curtains. The curtains 13 are of leather in the metal frames 11, and are provided with transparent window panels 15 mounted on horizontal metal brace strips provided for curtains 6, 7 and 9, the transparent panel being omitted from curtain 8. The leather composition which forms the body of the curtains 13 can extend over metal borders or not, as desired. I provide a hinged weather strip 16 of metal, as shown in Fig. 7. The door curtains 7 and 9 are each provided with a suitable knob 19 near their bottom edge and extending inside the car for operating the curtains. I provide a horizontal slot 20 in the lower portion of the metal frame of the curtains, as shown in Figs. 2 and 4, and in which slot the knob 19 is horizontally slidable. I also provide a vertical slot 21 in which also knob 19 is slidable, as shown in Figs. 2 and 3. As shown in Fig. 2, I provide L-shaped or horizontal extensions 22 at the end of slot 21 for locking the curtain either in its elevated or in its lowered position.

For raising curtains 6 and 8, I provide suitable rings 23. As shown in Fig. 8, I provide spring clips 24 attached to top frame 3, to hold curtains 6 and 8 releasably engaged in their raised position. I also provide spring clips 25 as illustrated in Fig. 9, also attached to the lower edge of frame 3, for the purpose of holding the door curtains in raised position while not interfering with opening and closing the door. The tongue 26 of spring clips 25 is extended in an approximately horizontal position, to permit of opening the door, as shown in Fig. 9. I provide the curtains with an enlarged uppermost horizontal edge, to close the slot in the door through which the curtain slides and thus shut off any cold air currents. As shown in Fig. 3, I provide a suitable weather strip 28, attached to the frame 3 and overlapping the upper edges of the curtain when they are in raised position. This weather strip 28 is provided with suitable snap fasteners 29 by means of which the weather strip may be secured in an inwardly folded position when the curtains are not in use, as shown in Fig. 10.

Referring to Figs. 11, 12 and 13, there is illustrated a double rod 30, mounted in suitable spring clips 31, the rod 30 having downward extension 32 engaging bracket 33 on which it is pivotally mounted, as illustrated in Fig. 12. I provide approximately L-shaped clips 34, shown in Fig. 13, of similar construction to members 25 heretofore described and for a like purpose.

In the modified form of sliding curtains shown in Figs. 14 and 15, the flexible leather or leather composition curtain 35 is provided with suitable window glass panels mounted in their upper portions. The lower portion of the curtain is rollably mounted on a suitable spring controlled roller 36 similar to that used for ordinary window shades, the projecting ends of the roller being slidable vertically in slots 37.

The construction illustrated in Figs. 13 and 14 makes it possible to use a flexible slidable curtain in cheaper cars where doors are not high enough to accommodate curtains as in the present style of Ford. It is a construction that permits of the use of a glass panel or other rigid transparent material as only the lower portion of the curtain rolls up on the rollers 36.

In operation, the form of curtain disclosed in Figs. 1–10 slides between rollers or discs 17 contained in the interior of the tonneau, the curtains being operated by knobs 19 or by rings 23, as the case may be, as illustrated in the drawings. The knobs 19, which are used for the door curtains, are slidable into and out of a locking position, as shown in Figs. 2 and 4.

In the modified form of my invention, of less expensive construction, the curtain is rollably mounted on a spring roller 36, except as to the rigid upper portion of the curtain which contains the rigid transparent panel 38, the roller in turn being vertically slidable in the vertical slots 37 in which it is operatively mounted, as illustrated in Figs. 14 and 15. Door curtains of this type are capable of being opened by reason of the novel releasing clip 34 shown in Fig. 13, and the hinging of the curtain on brackets 33 for swingable movement, as shown in Figs. 11 and 12. In other words, when the curtain is raised, the roller 36 will slide up to a point not far from the top of the door where it will catch and as the curtain is raised still further the roller will release enough of the flexible part of the curtain which has been rolled around it to permit of the upper edge of the curtain being attached to the top support. In lowering a curtain of this type the weight of the roller 36 will take it to the bottom of the car door and the spring mechanism of roller 36, which is of conventional construction similar to that in ordinary window shade rollers, will cause the curtain to roll up as to its lower flexible portion. It is my purpose to use glass panels in curtains of this type.

What I claim is:

1. A sliding curtain for automobiles, comprising a curtain member having a flexible portion, said curtain having an enlarged horizontal portion along its uppermost edge adapted to close the slot through which the curtain slides, a curtain container in the tonneau in which the flexible portion of the curtain is mounted for rollable movement and vertical slidable movement, a transparent panel in the upper portion of the curtain member, and means for securing the curtain in adjusted positions.

2. A sliding curtain for automobiles, comprising a flexible curtain member, a transparent rigid panel mounted in the upper portion of said curtain member, a spring roller on which the lower flexible portion of the curtain is rollably mounted, said roller having projecting ends, a curtain container arranged in the tonneau of the automobile and having vertically slotted portions, the projecting ends of the aforesaid roller being vertically slidable in said vertically slotted portions of the curtain container, substantially as shown.

3. In apparatus of the class described, vertically slidable automobile curtains, means for mounting said curtains for vertical slidable movement, spring clips releasably engaging the top edges of the curtains, said spring clips having one of their arms outturned in an approximately horizontal position to permit of the curtain edge disengaging from the clip when the curtain is mounted on a door and the door is opened.

4. A sliding curtain for automobiles, comprising a curtain member having a flexible portion, said curtain having an enlarged horizontal portion along its uppermost edge adapted to close the slot through which the curtain slides, a curtain container in the tonneau in which the collapsible portion of the curtain is mounted for rollable and vertical slidable movement, a transparent rigid panel in the upper portion of the curtain member, and means for securing the curtain in either of a plurality of adjusted positions.

HENRY B. MILSTEAD.